Feb. 27, 1945. C. E. WYRICK 2,370,602
COUPLING
Original Filed Aug. 13, 1941 2 Sheets-Sheet 2
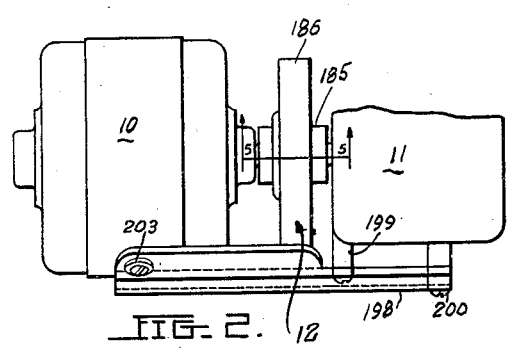
FIG. 2.
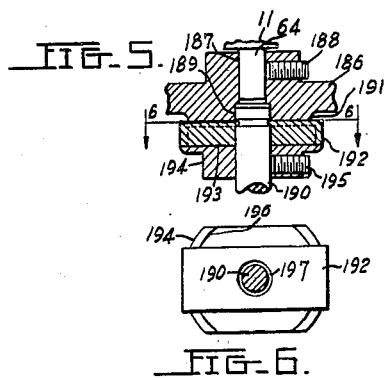
FIG. 5.
FIG. 6.
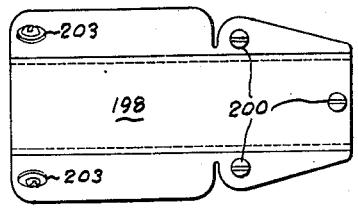
FIG. 4.
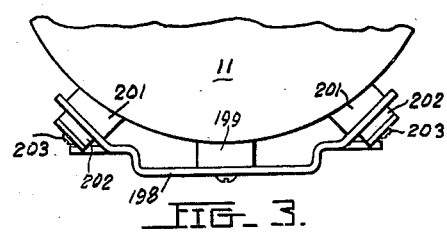
FIG. 3.
inventor
CLAYTON E. WYRICK
By Toulmin and Toulmin
attorneys Feb. 27, 1945.   C. E. WYRICK   2,370,602
COUPLING
Original Filed Aug. 13, 1941    2 Sheets-Sheet 1
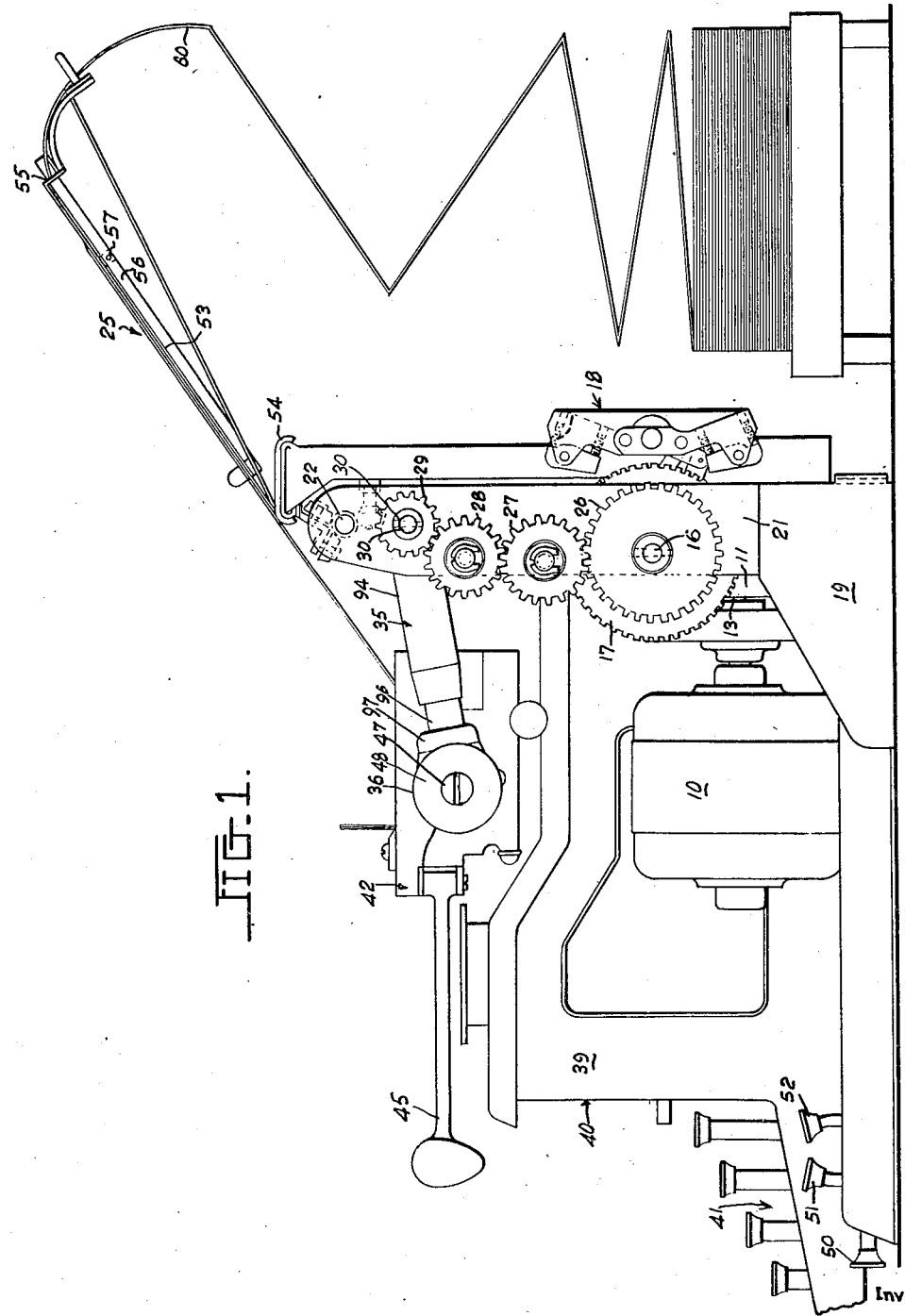
Inventor
CLAYTON E. WYRICK
by Toulmin and Toulmin
Attorneys Patented Feb. 27, 1945

2,370,602

UNITED STATES PATENT OFFICE 2,370,602

COUPLING

Clayton E. Wyrick, Miami, Fla., assignor to The Egry Register Company, Dayton, Ohio, a corporation of Ohio Original application August 13, 1941, Serial No. 406,623, now Patent No. 2,354,082, dated July 18, 1944. Divided and this application July 13, 1942, Serial No. 450,699

2 Claims. (Cl. 64—30)

This invention relates to an apparatus adapted to be associated with a typewriter for driving a sensitive power-driven apparatus for rotating the platen of the typewriter for line spacing and for running paper sheets in and out of the typewriter.

Another object of the invention is to provide an apparatus for aligning the shafts of a clutch and a driving motor for the same.

Another object of the invention is to provide a power unit having a driving and a driven apparatus wherein the driving apparatus is resiliently supported to permit alignment of the drive shaft of the same with respect to the drive shaft of the driven apparatus.

Another object of the invention is to provide a power unit constructed and arranged in a manner that a driven apparatus is rigidly supported and a driving apparatus for the same is resiliently supported in a manner that the drive shaft of the driving apparatus can be coaxially aligned with the drive shaft of the driven apparatus.

Another object of the invention is to provide a power unit constructed and arranged in accordance with the foregoing object wherein the driving and driven apparatus are mounted upon a common base.

It is another object of the invention to provide a driven apparatus rigidly supported upon a base and a driving apparatus resiliently supported upon the base in a manner that the position of the driving apparatus can be altered with respect to the driven apparatus to coaxially align the drive shafts of the same, and to dispose a friction clutch between the drive shafts of the driving and driven apparatus.

It is another object of the invention to provide a new and novel friction clutch.

Further objects and advantages will become apparent from the drawings and the following description.

In the drawings:

Figure 1 is a side elevational view of a typewriter showing the mechanism of this invention associated therewith.

Figure 2 is a side elevational view of the motor and clutch of the platen control device showing the manner of mounting these elements.

Figure 3 is an end elevational view of the motor and mounting plate for the same showing the manner of mounting the motor upon the plate.

Figure 4 is a bottom elevational view of the mounting plate for the motor and clutch.

Figure 5 is a cross-sectional view taken along line 5—5 of Figure 2 showing the coupling between the motor shaft and the clutch shaft.

Figure 6 is a cross-sectional view taken along line 6—6 of Figure 5.

The apparatus of this invention is adapted to be associated with a conventional typewriter for driving the platen of the typewriter and for driving a controlling mechanism associated therewith to position the paper web carried through the typewriter by the platen in predetermined preselected positions having a predetermined sequence and to repeat the sequence upon a subsequent portion of the web.

Referring to Figure 1, the typing machine platen control of this invention consists of a driving motor 10 connected to a clutch mechanism 11 through means of a coupling 12. The clutch 11 has a power output shaft 13 suitably geared to a countershaft 16. A line spacing and sheet length control member 17 is mounted upon the shaft 16 and has associated therewith a stop control 18 for regulating the degree of rotation of the line spacing and sheet length control member 17.

The aforementioned mechanism is carried upon a frame consisting of a base member 19 having vertical side frames 21. The side frames 21 extend in an upwardly direction on opposite sides of the base member 19 and are tied together adjacent the top edges thereof by means of the tie bar 22 which also serves to support a sheet carbon handling device 25. The shaft 16 has a gear 26 mounted upon the end thereof which is associated with a gear train consisting of the gears 27, 28 and 29. The gear 29 is mounted upon the end of a shaft 30 which is bearinged within the vertical side frames 21 by means of suitable bearings.

A platen driving mechanism 35 is carried upon the shaft 30 and has suitable gearing associated therewith for driving the platen 36 of a typing machine 40.

The typing machine 40 is of conventional construction consisting of a frame 39 which carries the keyboard 41. The frame 39 supports a transversely movable carriage 42 which in turn supports the platen 36. A type ribbon is provided adjacent the platen 36 in conventional manner and is supported by suitable spools. The usual spacing bar 45 is provided for manually rotating the platen 36 while the paper release for the pressure rollers which retain the paper in engagement with the platen 36 is operated by means of a suitable and conventional lever in the conventional manner. The end of the shaft 47 carrying the platen 36 is provided with knurled knobs 48 for manually rotating the platen 36 when desired.

Operation of the clutch 11 is controlled by means of the push buttons 50, 51 and 52 for initiating actuation of the clutch mechanism to drive the platen operating mechanism for rotating the platen for line spacing or for advancing or reversing the motion of the paper within the typing machine. The apparatus of this invention is particularly adaptable for feeding a paper web consisting of a plurality of individual webs in adjacent superimposed relationship through a typing machine for line spacing the web in the machine at predetermined positions and for repeating the identical line spacings as the web is passed through the machine so that typing can be accomplished upon repeated forms upon identical lines as the continuous web is fed through the machine. The carbon handling device 25 for permitting the making of a plural number of copies upon the individual webs is of the type wherein sheet carbon is used. When passing a continuous web of repeated forms through a typing machine and when using said carbon for duplication of copies, it is necessary that the paper web and carbon shall be simultaneously fed into the machine for typing purposes. After the typing has been completed upon one of the forms the paper web and the carbon sheets must be backed out of the machine so that the carbon sheets will be engaged by suitable mechanism of the carbon handling device 25 to prevent the same from advancing into the machine when the paper webs are again advanced to a position which permits one of the forms to be torn from the continuous web. Carbon handling devices for handling sheet carbon in this manner are well-known and a simplified form of such a device is shown associated with the platen control device of this invention.

The output shaft of the clutch 11 transmits power from the motor 10 to a series of gears, 26, 27, 28 and 29, comprising a gear train to the shaft 30 whereby the shaft 30 is rotated by means of the power derived from the motor 10. The gears 27 and 28 are suitably bearinged upon the vertical side frame 21, while the gears 29 and 26 are carried upon their respective shafts 30 and 16.

A power transmitting mechanism 35 is carried upon the shaft 30 and is adapted to transmit the rotary motion of the shaft 30 to the platen 36. This mechanism consists of a housing 94 journaled upon the shaft 30 and is adapted to reciprocate upon the shaft in unison with the shifting of the carriage 42 of the typing machine 42. A housing 97 is journaled upon the platen shaft 47. A telescoping extension 96 extending from the housing 97 into the housing 94 provides means for transmitting the shifting motion of the carriage 42 of the typing machine 40 to the platen driving mechanism 35. All of which is more fully disclosed and described in my copending application, S. N. 406,623, filed August 13, 1941, now Patent No. 2,354,082 dated July 18, 1944 of which this application is a division.

The motor 10 drives the clutch mechanism 11 through means of a friction coupling 185. This coupling 185 consists of a flywheel 186 journaled upon the drive shaft 64 of the clutch 11. A recess 189 is provided in the flywheel 186 in coaxial alignment with the bore 187 for the shaft 64 to receive the end of the motor shaft 190. A set screw 188 is threaded into the hub of the flywheel 186 for securing the flywheel to the clutch drive shaft 64.

The forward face of the flywheel 186 is provided with a boss 191 which has a finished surface thereon to engage a leather key 192 positioned within a slot 193 provided in a coupling member 194 journaled upon the motor shaft 190.

The coupling member 194 is secured to the motor shaft 190 by means of the set screw 195. The face of the coupling member 194 is provided with a cylindrical recess 196 which is just slightly larger in diameter than the boss 191 on the face of the flywheel 186. A transverse rectangular recess 193 is provided in the face of the coupling member 194. A rectangular leather key 192 is disposed within the recess and is provided with a hole 197 through which the motor shaft 190 extends.

To engage the coupling member 194 and the flywheel boss 191 the coupling member 194 is slidably advanced upon the motor shaft 190 toward the face of the boss 191 on the flywheel 186 until the face of the leather key 192 is in tight surface engagement with the surface of the boss 191. The set screw 195 is then tightened upon the motor shaft 190 to secure the coupling member 194 in position. This arrangement provides a friction drive from the motor to the clutch which permits slippage between the motor drive and the clutch 11 should the clutch 11 become jammed.

The clutch 11 and the motor 10 are secured to a common mounting plate 198. The clutch 11 is provided with three extending legs 199 which are secured to the mounting plate 198 by means of the screws 200. The motor 10 is supported upon the mounting plate by means of the rubber grommets or blocks 201. Two of these support members are provided for positioning the motor upon the mounting plate 198. A rubber grommet 202 is provided adjacent the bottom surface of the mounting plate 198 and a screw 203 extends through the rubber mounting members 202 and 201 into threaded engagement with the motor 10.

The rubber mounting members 201 and 202 provide a certain amount of resiliency to the mounting means so that the shaft 190 of the motor can be properly aligned with the bore 189 provided in the flywheel 186. By either tightening or loosening the screws 203 the motor 10 and shaft 190 can be shifted vertically or angularly with respect to the vertical, limited only by the degree of compressibility of the rubber mounting members 201 and 202. Such a mounting provides a very accurate method of aligning the motor shaft 190 with the clutch driving shaft 64.

The friction drive device just described provides a safety device between the motor 10 and the clutch 11.

While the apparatus disclosed and described herein is a preferred form of the invention, it is to be understood that the construction and arrangement of the apparatus of the invention can be altered without departing from the spirit of the invention; and that it is intended that all such modifications shall be included herein, which modifications fall within the scope of the appended claims.

Having thus fully described my invention what I claim as new and desire to secure by Letters Patent is:

1. A friction coupling adapted to be disposed between coaxially aligned shafts of a driving and a driven apparatus which consists of a body having a bore therein to receive the shaft of a driven apparatus, means extending from said bore for securing said body upon the shaft of the driven apparatus, said bore in said body being adapted to receive the end of the shaft of a driving apparatus, a friction face on said body extending radially from the axis of said body, a second body having a bore therein and adapted to be carried by the shaft of a driving apparatus, means extending from the bore in said second body for securing said body to the shaft of a driving apparatus, and a rectangular friction member carried by said second body and having a friction face extending radially from the axis of said second body for engaging the friction face of said first body.

2. A friction coupling adapted to be disposed between coaxially aligned shafts of a driving and a driven apparatus which consists of a body having a bore therein to receive the shaft of a driven apparatus, means extending from said bore for securing said body upon the shaft of the driven apparatus, said bore in said body being adapted to receive the end of the shaft of a driving apparatus, a friction face on said body extending radially from the axis of said body, a second body having a bore therein and adapted to be carried by the shaft of a driving apparatus, means extending from the bore in said second body for securing said body to the shaft of a driving apparatus, and a resilient friction member carried in a keyway slot in said second body and having a friction face extending radially from the axis of said second body for engaging the friction face of said first body.

CLAYTON E. WYRICK.